United States Patent
Sawa et al.

(10) Patent No.: US 10,563,719 B2
(45) Date of Patent: Feb. 18, 2020

(54) AIR SPRING AND BOGIE

(71) Applicants: Sumitomo Electric Industries, Ltd., Osaka-shi, Osaka (JP); KAWASAKI JUKOGYO KABUSHIKI KAISHA, Kobe-shi, Hyogo (JP)

(72) Inventors: Takayuki Sawa, Osaka (JP); Hideki Kitada, Osaka (JP); Yasuhiko Ura, Osaka (JP); Takehiro Nishimura, Kobe (JP); Keiichiro Kamura, Kobe (JP); Yoshi Sato, Sanda (JP)

(73) Assignees: Sumitomo Electric Industries, Ltd., Osaka-shi, Osaka (JP); KAWASAKI JUKOGYO KABUSHIKI KAISHA, Kobe-shi, Hyogo (JP)

(*) Notice: Subject to any disclaimer, the term of this patent is extended or adjusted under 35 U.S.C. 154(b) by 227 days.

(21) Appl. No.: 15/527,130

(22) PCT Filed: Oct. 17, 2016

(86) PCT No.: PCT/JP2016/080697
§ 371 (c)(1),
(2) Date: May 16, 2017

(87) PCT Pub. No.: WO2018/073862
PCT Pub. Date: Apr. 26, 2018

(65) Prior Publication Data
US 2019/0093729 A1 Mar. 28, 2019

(51) Int. Cl.
*F16F 9/05* (2006.01)
*F16F 9/04* (2006.01)
(Continued)

(52) U.S. Cl.
CPC .............. *F16F 9/0454* (2013.01); *B61F 5/10* (2013.01); *F16B 1/02* (2013.01); *F16F 9/05* (2013.01);
(Continued)

(58) Field of Classification Search
CPC ....... B61F 5/08; B61F 5/10; F16F 9/05; F16F 9/052; F16F 9/44; F16F 13/002; B60G 11/27; B60G 11/62
(Continued)

(56) References Cited

U.S. PATENT DOCUMENTS 2,927,540 A * 3/1960 Seley .................. B61F 5/10
                                                         105/198.1
3,112,922 A * 12/1963 Musschoot ............... F16F 9/04
                                                         188/268
(Continued)

FOREIGN PATENT DOCUMENTS

JP   H04-84813 U   7/1992
JP   H04-84904 U   7/1992
(Continued)

*Primary Examiner* — Christopher P Schwartz
(74) *Attorney, Agent, or Firm* — Drinker Biddle & Reath LLP (57) ABSTRACT

An air spring includes an outer cylindrical member, an inner cylindrical member, a diaphragm, the diaphragm providing an internal space between the outer cylindrical member and the inner cylindrical member, a stopper assembly arranged in the internal space as being pivotable over the inner cylindrical member, a handle for pivoting the stopper assembly over the inner cylindrical member, a guide member attached to the handle as rising from the handle, a positioning member attached by insertion in a guide hole in the guide member for positioning of the handle, a positioning hole provided in the inner cylindrical member which can receive the positioning member, and a holding mechanism in the inner cylindrical member. A position of the stopper assembly
(Continued)

with respect to the inner cylindrical member is determined by inserting the positioning member in the positioning hole.

10 Claims, 8 Drawing Sheets

(51) Int. Cl.
  *B61F 5/10* (2006.01)
  *F16F 9/44* (2006.01)
  *F16B 1/02* (2006.01)
  *F16F 9/58* (2006.01)
(52) U.S. Cl.
  CPC ............... *F16F 9/052* (2013.01); *F16F 9/44* (2013.01); *F16F 9/585* (2013.01); *F16F 2226/04* (2013.01)
(58) Field of Classification Search
  USPC ...... 267/35, 64.19–64.27, 122; 280/124.145, 280/124.157
  See application file for complete search history.

(56) References Cited

U.S. PATENT DOCUMENTS

| | | | |
|---|---|---|---|
| 6,257,561 B1* | 7/2001 | Nakayama | F16F 9/05 267/122 |
| 9,061,689 B2* | 6/2015 | Fujimoto | B61F 5/02 |
| 9,545,933 B2* | 1/2017 | Nishimura | B61F 5/10 |
| 2011/0031662 A1* | 2/2011 | Toyama | B61F 5/02 267/121 |
| 2012/0061887 A1* | 3/2012 | Westnedge | B60G 11/27 267/64.24 |
| 2013/0313764 A1* | 11/2013 | Fujimoto | B61F 5/02 267/64.27 |
| 2014/0117597 A1* | 5/2014 | Fujimoto | B60G 11/62 267/35 |
| 2014/0191487 A1 | 7/2014 | Sachan | |
| 2016/0185363 A1* | 6/2016 | Nishimura | B61F 5/10 105/199.1 |
| 2018/0290669 A1* | 10/2018 | Sawa | B61F 5/10 |
| 2018/0312174 A1* | 11/2018 | Sawa | F16F 9/44 |

FOREIGN PATENT DOCUMENTS

| | | |
|---|---|---|
| JP | 2000-035075 A | 2/2000 |
| JP | 2007-139056 A | 6/2007 |
| JP | 2009-63067 A | 3/2009 |
| JP | 2011-245937 A | 12/2011 |
| JP | 2012-17768 A | 1/2012 |
| JP | 2012-17769 A | 1/2012 |
| JP | 2012-145135 A | 8/2012 |

\* cited by examiner

FIG.10 ic field, the present invention relates to an air spring and a bogie.

AIR SPRING AND BOGIE

TECHNICAL FIELD

The present invention relates to an air spring and a bogie.

BACKGROUND ART

An air spring making use of elasticity of compressed air has conventionally been known. For example, Japanese Patent Laying-Open No. 2012-145135 describes one example of a conventional air spring. The air spring described in this document includes a stopper for restricting an amount of displacement in an up-down direction, in which a movable body having a stopper face moves in the up-down direction as the movable body is rotated around a central axis by operating a handle. A plurality of pin insertion holes for insertion of pins inserted through pin holes in the handle are provided in a lower surface of a holding body holding the movable body as being movable in the up-down direction. By fixing the handle to the holding body with the movable body being positioned in a height direction, a height of the stopper face can be maintained. A split pin prevents the pin inserted through the pin hole from coming off from the pin hole.

CITATION LIST

Patent Document

PTD 1: Japanese Patent Laying-Open No. 2012-145135

SUMMARY OF INVENTION

An air spring according to one manner of the present invention includes an outer cylindrical member, an inner cylindrical member combined with the outer cylindrical member, a diaphragm coupling the outer cylindrical member and the inner cylindrical member to each other and providing an internal space between the outer cylindrical member and the inner cylindrical member, a stopper assembly arranged in the internal space as being pivotable over the inner cylindrical member, the stopper assembly allowing suppression of movement of the outer cylindrical member toward the inner cylindrical member more than necessary, a handle for pivoting the stopper assembly over the inner cylindrical member, a guide member attached to the handle as rising from the handle, a positioning member attached by insertion in a guide hole in the guide member for positioning of the handle, a positioning hole provided in the inner cylindrical member which can receive the positioning member, and a holding mechanism for holding the positioning member in the inner cylindrical member with the positioning member being inserted in the positioning hole. A position of the stopper assembly with respect to the inner cylindrical member is determined by inserting the positioning member in the positioning hole.

DESCRIPTION OF EMBODIMENTS

Problems to be Solved by the Present Disclosure

An air spring in an embodiment of the present invention will be explained below with reference to FIGS. 1 to 9. Firstly, problems of the air springs in PTD 1 (Japanese Patent Laying-Open No. 2012-145135) described above will be explained.

Initially, the air spring described in PTD 1 will be explained. In this air spring (1), a stopper face (6) can be moved upward and downward by operating a handle (19) to rotate a movable body (7) having the stopper face (6). While the movable body (7) is positioned in a height direction, pins (43) inserted through pin holes (28) in the handle (19) are inserted in a plurality of pin insertion holes (44) provided in a lower surface of a holding body (8) and a split pin (45) is attached to the pin (43). The pin (43) is thus prevented from coming off from the pin hole (28).

In the air spring (1) described in PTD 1, the split pin (45) should be inserted along a horizontal direction after the pin (43) is inserted, however, a space in the horizontal direction is obstructed by a bellows (2). Therefore, the space where an operation to fix the pin (43) with the use of the split pin (45) is performed is small and the operation to fix the pin (43) with the use of the split pin (45) has been difficult.

Effects of the Present Disclosure

The air spring in the present embodiment can solve the problems of the air spring described in PTD 1 as above. Since the air spring in the present embodiment includes the guide member attached to the handle as rising from the handle, the positioning member can be inserted in the guide hole in the guide member in a vertical direction. Thus, in the air spring in the present embodiment, such a difficult operation as insertion of the split pin in the horizontal direction for prevention of the pin from coming off as in the air spring described in PTD 1 can be avoided.

DESCRIPTION OF EMBODIMENTS OF THE INVENTION OF THE PRESENT APPLICATION

Embodiments of the invention of the present application will initially be listed and described.

(1) An air spring according to one manner of the present invention includes an outer cylindrical member, an inner cylindrical member, a diaphragm, a stopper assembly, a handle, a guide member, a positioning member, and a holding mechanism. The inner cylindrical member is combined with the outer cylindrical member. The diaphragm couples the outer cylindrical member and the inner cylindrical member to each other and provides an internal space between the outer cylindrical member and the inner cylindrical member. The stopper assembly is arranged in the internal space as being pivotable over the inner cylindrical member and can suppress movement of the outer cylindrical member toward the inner cylindrical member more than necessary. The handle allows pivot of the stopper assembly over the inner cylindrical member. The guide member is attached to the handle as rising from the handle. The positioning member is attached by insertion in a guide hole in the guide member and used for positioning of the handle. The positioning hole is provided in the inner cylindrical member and can receive the positioning member. The holding mechanism holds the positioning member in the inner cylindrical member with the positioning member being inserted in the positioning hole. A position of the stopper assembly with respect to the inner cylindrical member is determined by inserting the positioning member in the positioning hole.

(2) In the air spring according to (1), the guide hole and the positioning hole may extend in the same direction.

(3) In the air spring according to (1) or (2), the positioning hole may pass through the inner cylindrical member.

(4) In the air spring according to (3), the positioning hole may have an end opposite to the guide hole closed at least by the diaphragm.

(5) In the air spring according to (1) or (2), the positioning hole may have an end opposite to the guide hole closed by the inner cylindrical member.

(6) In the air spring according to any one of (1) to (5), the guide member may be attached by fitting one end of the guide member into an opening in the handle.

(7) In the air spring according to any one of (1) to (6), the guide hole may pass through the guide member.

(8) In the air spring according to any one of (1) to (7), the guide member may serve as a grip portion in pivoting the stopper assembly.

(9) In the air spring according to any one of (1) to (8), a male screw may be adopted as the positioning member, a female screw may be adopted as the positioning hole, and the positioning member and the positioning hole may be screwed to each other.

(10) In the air spring according to (9), the holding mechanism may be implemented by a thread and a thread groove of the male screw and a thread and a thread groove of the female screw.

(11) In the air spring according to any one of (1) to (8), a plunger including a movable portion and a fixed portion may be adopted as the positioning member and the fixed portion may be held by the guide member.

(12) in the air spring according to (11), the movable portion may be retracted in the guide hole when an outer surface of the inner cylindrical member is in contact with the movable portion and may enter the positioning hole when the outer surface of the inner cylindrical member is no longer in contact with the movable portion.

(13) A bogie according to one manner of the present disclosure includes the air spring according to any of (1) to (12). Thus, even when vibration is applied in a direction perpendicular to a direction from the outer cylindrical member to the inner cylindrical member, break of the air spring can be suppressed.

Details of Embodiments of the Invention of the Present Application

Details of the embodiments of the invention of the present application will now be described. The same or corresponding elements in the drawings used for explanation of the embodiments have the same reference characters allotted.

First Embodiment

Figure 1:
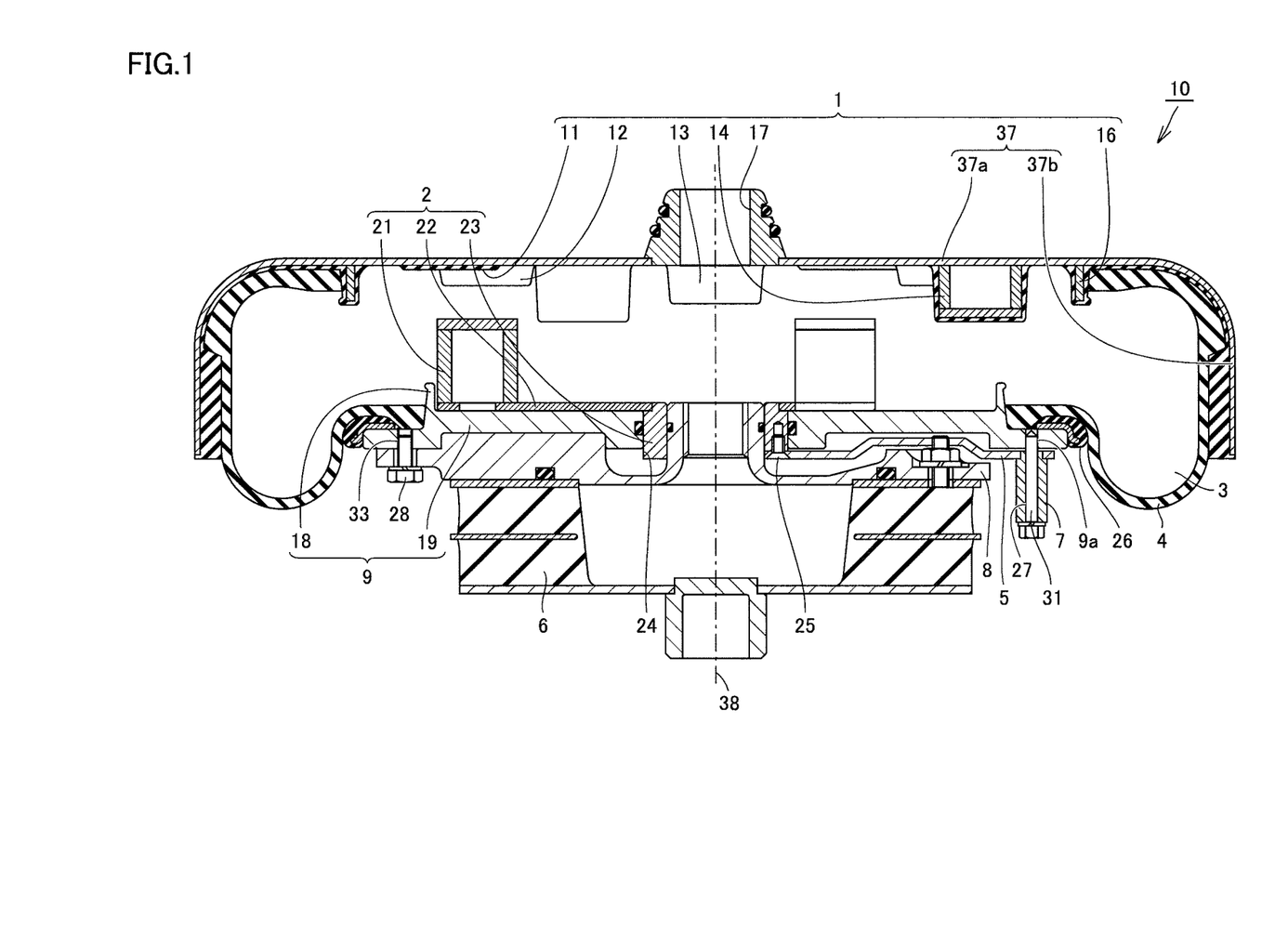
FIG. 1 is a schematic cross-sectional view of an air spring in a first embodiment of the present invention.

FIG. 1 shows an air spring in a first embodiment of the present invention. As shown in FIG. 1, an air spring 10 mainly has an outer cylindrical member 1, an inner cylindrical member 9, a diaphragm 4, a stopper assembly 2, a handle 5, and a space portion 3. Outer cylindrical member 1 has an upper plate 37 having a flat plate portion 37a in a central portion and a sidewall portion 37b in a circumferential edge portion, a plurality of protrusion portions 11 to 14 protruding from flat plate portion 37a, and a ring-shaped projection portion 16 rising from flat plate portion 37a and located outside protrusion portions 11 to 14. A hole portion is provided in the central portion of flat plate portion 37a of upper plate 37 and a coupling portion 17 is attached to the hole portion. Protrusion portions 11 to 14 are cylindrical and different in height from one another as shown in FIG. 1. Though protrusion portions 11 to 14 are hollow in the example in FIG. 1, they may be solid.

As shown in FIG. 1, inner cylindrical member 9 includes a hole portion 24 provided in a central portion, a lower plate 19 having an upper surface portion around hole portion 24, and a flange portion 18 rising from lower plate 19. Stopper assembly 2 is arranged on the upper surface portion of lower plate 19. Stopper assembly 2 has a plurality of stopper portions 21 in a cylindrical shape, a base portion 22 carrying stopper portion 21, and a ring portion 23 attached by insertion in hole portion 24 in the central portion of lower plate 19, Stopper portion 21 has a function to suppress movement of outer cylindrical member 1 toward inner cylindrical member 9 by a prescribed amount or more.

As shown in FIG. 1, diaphragm 4 couples outer cylindrical member 1 and inner cylindrical member 9 to each other and provides space portion 3 therebetween. A portion of diaphragm 4 on one end side extends along sidewall portion 37b and flat plate portion 37a of outer cylindrical member 1 and one end of diaphragm 4 abuts on ring-shaped projection portion 16 of outer cylindrical member 1. The other end of diaphragm 4 is located on a circumferential edge portion of inner cylindrical member 9 and abuts on flange portion 18 of inner cylindrical member 9. Thus, space portion 3 which is an internal space of air spring 10 can hermetically be sealed. A rubber seat 26 is arranged between diaphragm 4 and the circumferential edge portion of inner cylindrical member 9.

A bottom plate 8 is arranged under inner cylindrical member 9. Bottom plate 8 has a cylindrical portion in its central portion and the cylindrical portion is attached by insertion in ring portion 23 of stopper assembly 2. A screw hole 33 is provided in inner cylindrical member 9, and bottom plate 8 can be fixed to inner cylindrical member 9 by screwing a bolt 28 inserted into bottom plate 8 into screw hole 33. Handle 5 for pivotally operating stopper assembly 2 is disposed between inner cylindrical member 9 and bottom plate 8. Handle 5 horizontally extends. One end of handle 5 is fixed to ring portion 23 by a screw 25. The other end of handle 5 is located outside bottom plate 8. Stopper assembly 2 is pivoted over lower plate 19 by pivoting handle 5 around a central axis 38 of air spring 10. A laminated rubber portion 6 is arranged under bottom plate 8. In the present embodiment, a horizontal direction means a direction orthogonal to central axis 38 and a vertical direction means a direction in parallel to central axis 38.

At one end of handle 5 on an outer side, a guide member 7 is attached to handle 5 as extending vertically downward from handle 5. A positioning member 31 for positioning handle 5 is attached by insertion in a guide hole 27 in guide member 7. A positioning hole 9a which can receive positioning member 31 is provided in lower plate 19 of inner cylindrical member 9. Handle 5 is fixed to stopper assembly 2. Therefore, as a tip end of positioning member 31 is inserted in positioning hole 9a, a position of handle 5 with respect to inner cylindrical member 9 is determined and a position of stopper assembly 2 with respect to inner cylindrical member 9 is also determined.

Figure 2:
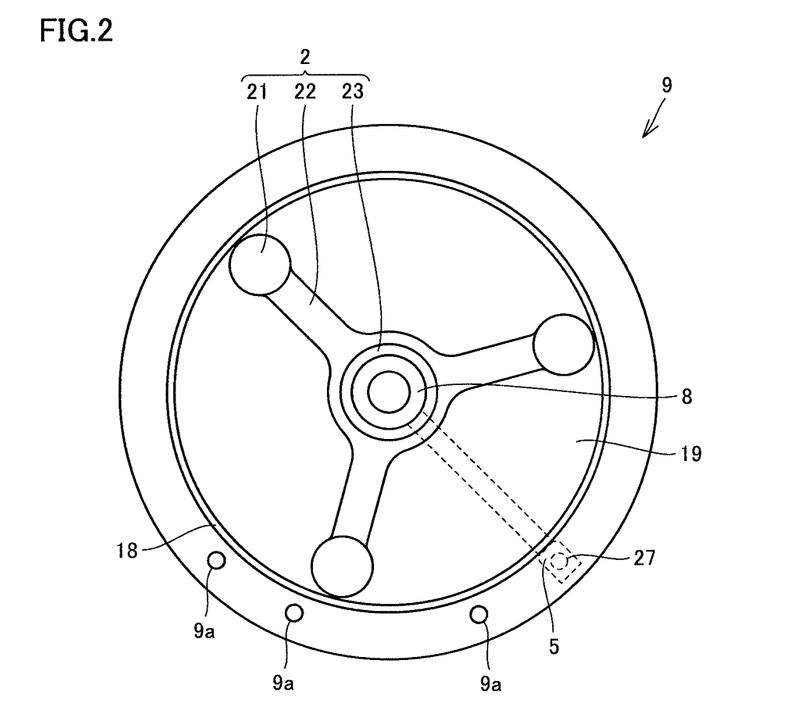
FIG. 2 is a schematic plan view of an exemplary internal structure of an inner cylindrical member.

FIG. 2 shows a schematic plan view of an exemplary internal structure of inner cylindrical member 9. As shown in FIG. 2, stopper assembly 2 includes three base portions 22 and stopper portion 21 is fixed onto an outer end portion of each base portion 22. Each of three base portions 22 extends from ring portion 23 toward the outer circumference. In a plan view, three stopper portions 21 are arranged, for example, at positions corresponding to 0°, 120°, and 240°.

Three base portions 22 are simultaneously pivoted by pivotally operating handle 5 and accordingly three stopper portions 21 are also simultaneously pivoted. Three base portions 22 slide over the upper surface portion of lower plate 19 of inner cylindrical member 9.

Figure 3:
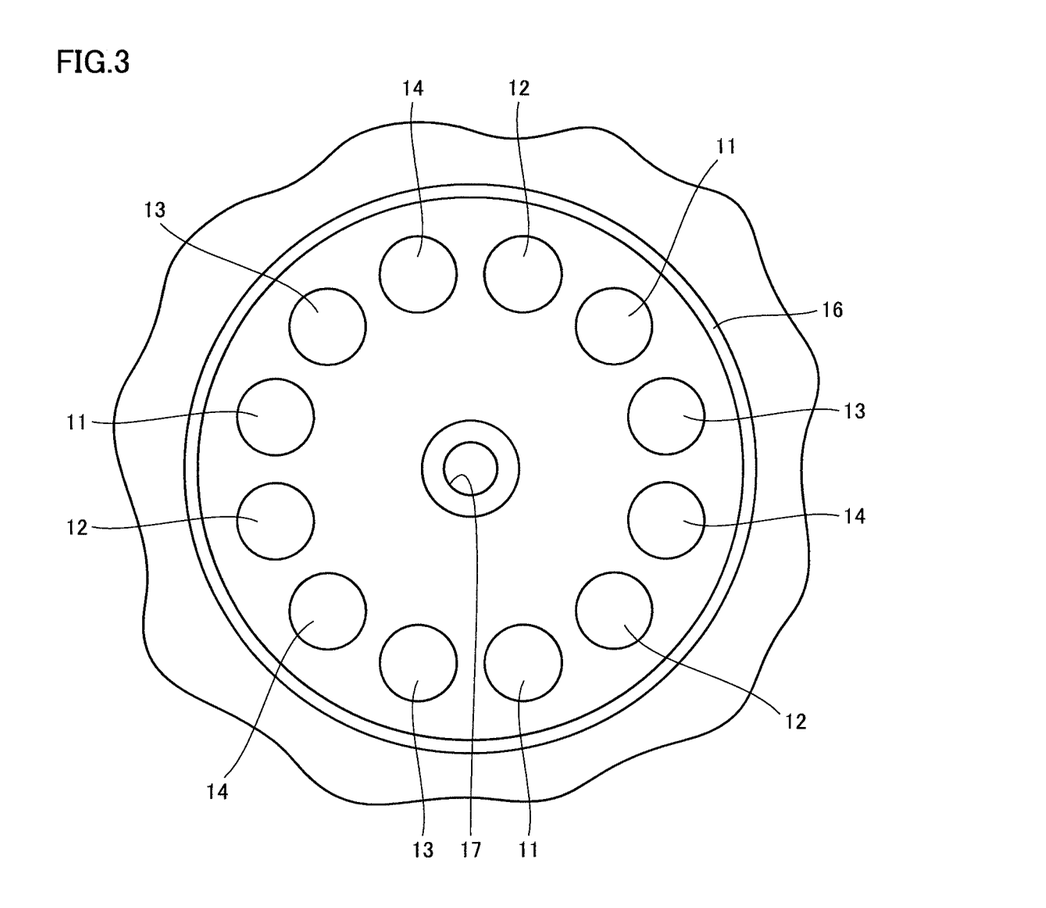
FIG. 3 is a schematic plan view of an exemplary internal structure of an outer cylindrical member.

FIG. 3 shows a schematic plan view of an exemplary internal structure of outer cylindrical member 1. As shown in FIG. 3, in a plan view, protrusion portions 11 to 14 at four heights are arranged at an equal interval. In the example in FIG. 3, three sets of four types of protrusion portions 11 to 14 different in height from one another are provided. Each of the plurality of protrusion portions 11 to 14 is provided inside ring-shaped projection portion 16 and outside coupling portion 17. Each of the plurality of protrusion portions 11 to 14 is annularly provided.

Figure 4:
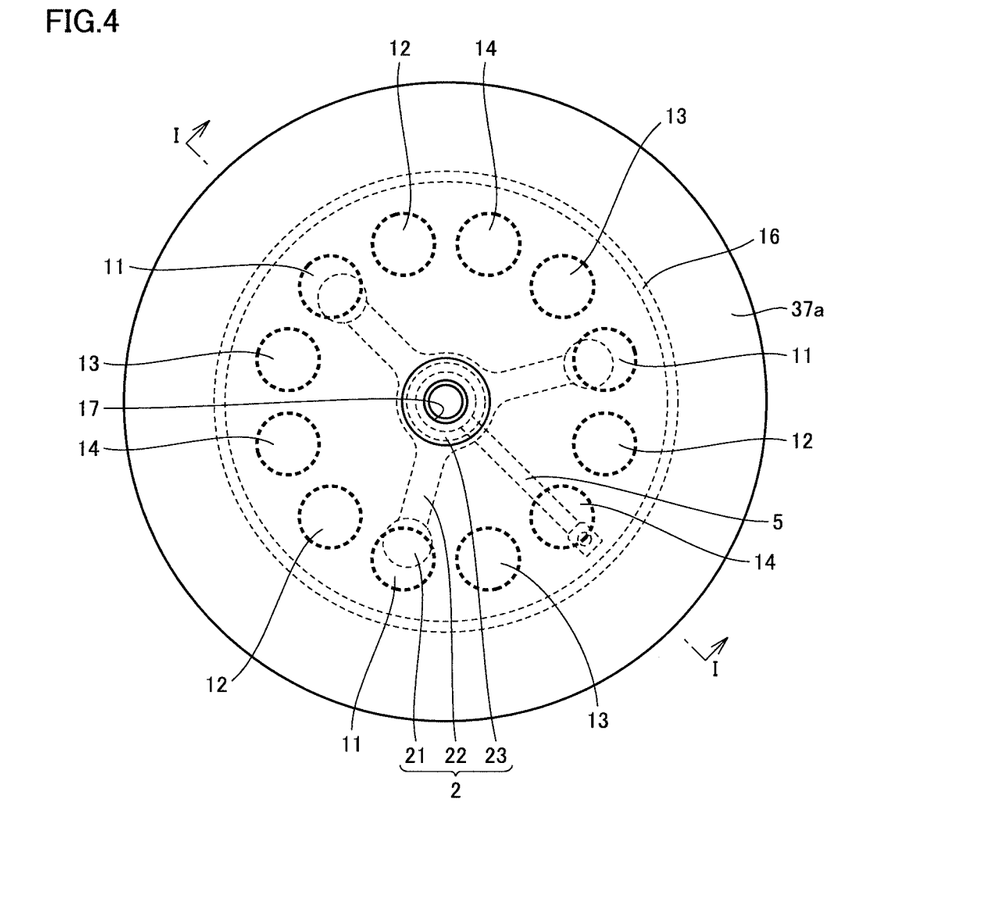
FIG. 4 is a schematic perspective view of the air spring viewed from a side of the outer cylindrical member.

FIG. 4 shows a schematic perspective view of air spring 10 when viewed from a side of the outer cylindrical member. As shown in FIG. 4, three protrusion portions 11 equal in height are arranged at positions corresponding to three stopper portions 21 equal in height. Protrusion portions 12 to 14 are also similarly arranged. Thus, three stopper portions 21 can simultaneously be arranged at positions opposed to three protrusion portions 11 at the same height by pivoting three stopper portions 21. When outer cylindrical member 1 is lowered toward inner cylindrical member 9, three protrusion portions 11 are born by three stopper portions 21.

Figure 5:
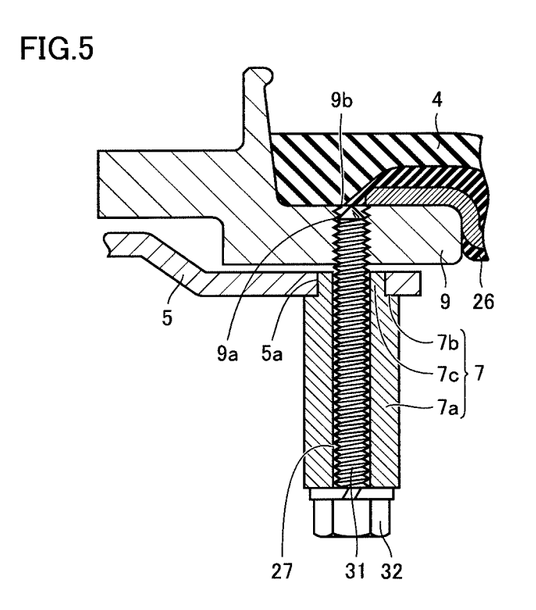
FIG. 5 is an enlarged schematic perspective cross-sectional view of a guide member and the vicinity thereof in the first embodiment of the present invention.

FIG. 5 shows an enlarged schematic perspective cross-sectional view of guide member 7 and the vicinity thereof. In the example shown in FIG. 5, positioning member 31 implemented by a male screw passes through guide hole 27 in guide member 7 and the tip end of positioning member 31 is inserted and screwed into positioning hole 9a in inner cylindrical member 9 implemented by a female screw. Positioning member 31 is held in inner cylindrical member 9 by being screwed to positioning hole 9a in inner cylindrical member 9. Guide hole 27 and positioning hole 9a extend in the same direction (the vertical direction in the present embodiment). Therefore, positioning member 31 inserted through guide hole 27 can be inserted in positioning hole 9a.

Air spring 10 can be used in various applications such as a suspension, a vibration isolator, and a vehicle height controller. When the air spring is employed, for example, in railway vehicles, air spring 10 is attached between a vehicular body of a railway vehicle and a bogie unit (a bogie and wheels). When wheels are worn out as the railway vehicle is used, a height of the railway vehicle becomes low and an operator performs, for example, operations below for controlling the height.

Initially, positioning member 31 is turned with respect to inner cylindrical member 9 so as to unscrew positioning member 31 from inner cylindrical member 9, and positioning member 31 is removed from guide member 7 and inner cylindrical member 9. Then, guide member 7 attached to handle 5 is gripped as a grip portion and handle 5 is pivoted with respect to central axis 38. Thus, stopper assembly 2 is pivoted with respect to lower plate 19 of inner cylindrical member 9. Stopper assembly 2 is pivoted to a position where stopper portion 21 faces a protrusion portion greater in height than the current protrusion portion among protrusion portions 11 to 14 of outer cylindrical member 1. When stopper assembly 2 is positioned, positioning member 31 is inserted in guide hole 27 in guide member 7 and the tip end of positioning member 31 is inserted in positioning hole 9a as being screwed to positioning hole 9a in inner cylindrical member 9. Thus, positioning member 31 can be held in inner cylindrical member 9 with positioning member 31 being screwed to positioning hole 9a. By unscrewing positioning member 31 from inner cylindrical member 9, positioning member 31 can again be removed from inner cylindrical member 9. In the present embodiment, a thread and a thread groove of positioning member 31 for screwing between positioning member 31 and inner cylindrical member 9 and a thread groove and a thread of positioning hole 9a in inner cylindrical member 9 function as a holding mechanism for holding positioning member 31 in inner cylindrical member 9 with positioning member 31 being screwed to positioning hole 9a.

As set forth above, in the present embodiment, positioning member 31 is screwed to positioning hole 9a through guide hole 27 vertically upward (on a side of outer cylindrical member 1 in the present embodiment) from below (on a side of inner cylindrical member 9 in the present embodiment) so that handle 5 and stopper assembly 2 can be positioned with respect to inner cylindrical member 9. Therefore, in the present embodiment, such a difficult operation as use of the split pin in the horizontally extending limited space restricted by diaphragm 4 around handle 5 for prevention of the pin from coming off as in the air spring described in PTD 1 can be avoided.

Figure 6:
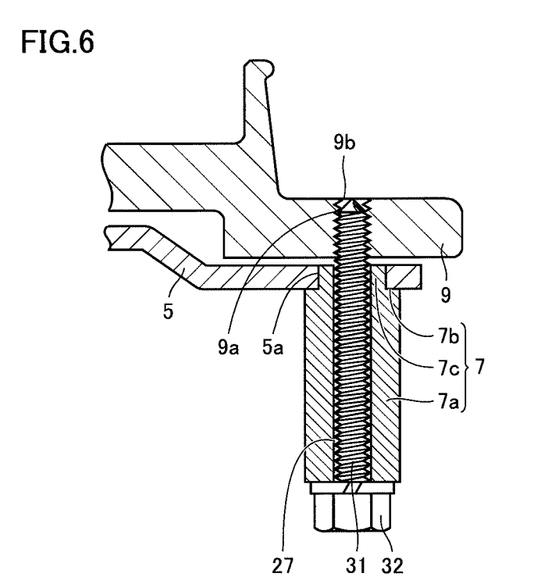
FIG. 6 is an enlarged schematic perspective cross-sectional view of one example of a positioning hole and the vicinity thereof.
Figure 7:
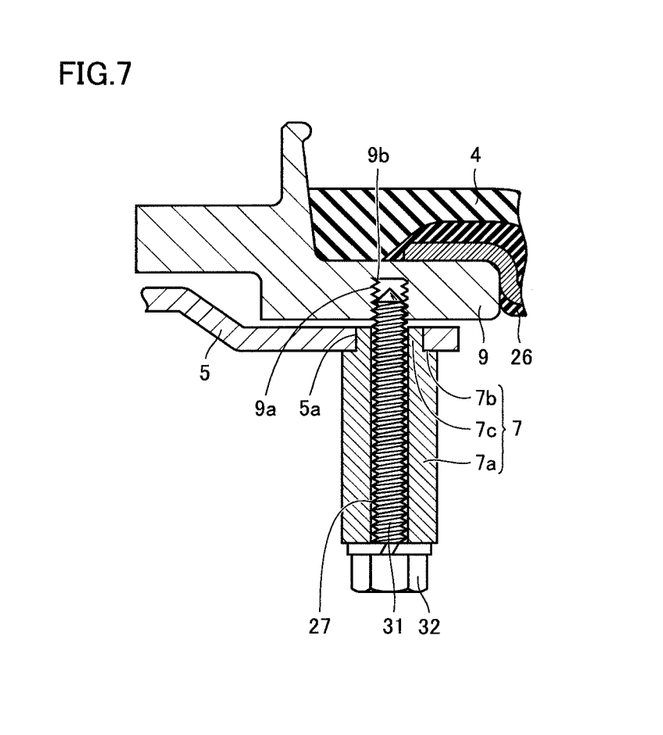
FIG. 7 is an enlarged schematic perspective cross-sectional view of another example of a positioning hole and the vicinity thereof.

In the present embodiment, such a form that positioning hole 9a is implemented by a female screw vertically passing through inner cylindrical member 9 and an end 9b of positioning hole 9a opposite to guide hole 27 is closed by diaphragm 4 and rubber seat 26 has been described. For example as shown in FIG. 6, however, end 9b of positioning hole 9a may be opened without being closed, or for example as shown in FIG. 7, end 9b of positioning hole 9a may be closed by inner cylindrical member 9. In such a case as well, as in the example in which end 9b of positioning hole 9a is closed by diaphragm 4 and rubber seat 26, the problem of the air spring described in PTD 1 can be solved.

In the present embodiment, guide member 7 includes a main body portion 7a in a shape of a hexagonal prism and a tip end portion 7c provided at one end of main body portion 7a in a shape of a hexagonal prism smaller than main body portion 7a. By fitting tip end portion 7c of guide member 7 into an opening 5a in handle 5 such that a shoulder portion 7b of guide member 7 is in contact with handle 5, guide member 7 is attached to handle 5. A method of attaching guide member 7 to handle 5 is not particularly limited.

In the present embodiment, positioning member 31 is inserted in guide hole 27 in guide member 7. Though positioning member 31 has one end screwed to positioning hole 9a in inner cylindrical member 9, it has the other end joined to a locking member 32. A method of joining positioning member 31 and locking member 32 to each other is not particularly limited and positioning member 31 and locking member 32 may be integrated.

Second Embodiment

Figure 8:
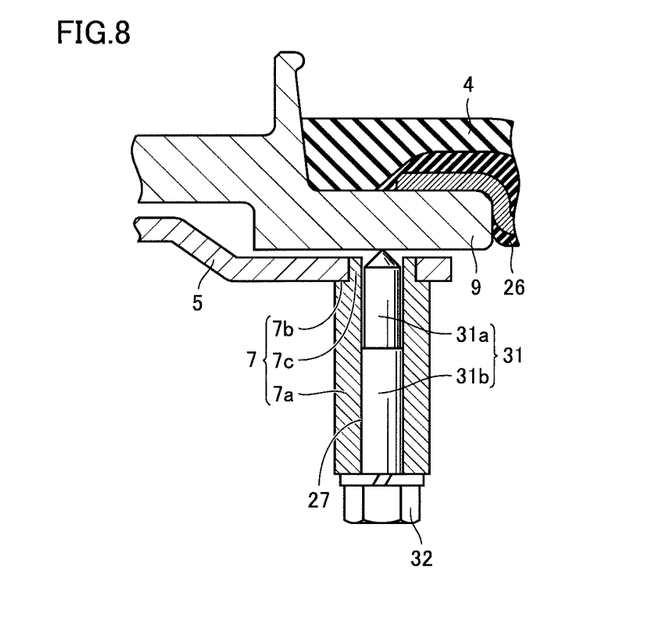
FIG. 8 is an enlarged schematic perspective cross-sectional view of the guide member and the vicinity thereof in a second embodiment of the present invention.
Figure 9:
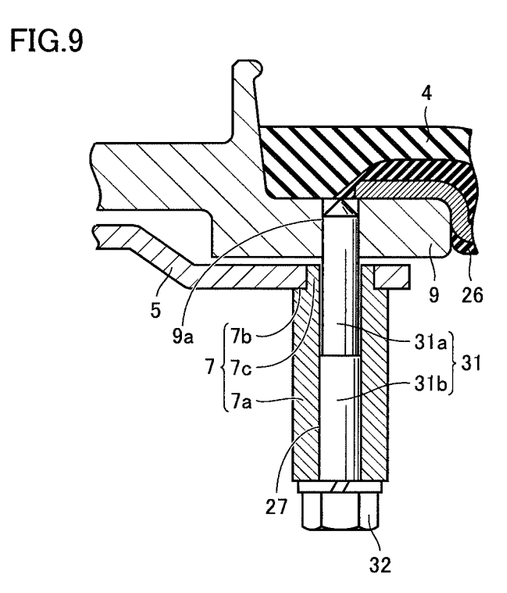
FIG. 9 is an enlarged schematic perspective cross-sectional view of the guide member and the vicinity thereof in the second embodiment of the present invention.

A second embodiment of the present invention will now be described with reference to FIGS. 8 and 9. FIGS. 8 and 9 are enlarged schematic perspective cross-sectional views of guide member 7 and the vicinity thereof in the air spring in the second embodiment.

As shown in FIG. 8, in the second embodiment, a plunger including a movable portion 31a and a fixed portion 31b is employed as positioning member 31. Specifically, fixed portion 31b is held in guide hole 27 in guide member 7 and movable portion 31a is movable vertically upward (the side of outer cylindrical member 1 in the present embodiment) and downward (the side of inner cylindrical member 9 in the present embodiment). For example, the plunger as positioning member 31 is constructed such that the plunger has a spring in a hollow portion extending in the vertical direction of cylindrical fixed portion 31b and movable portion 31a is provided on the spring. As the spring extends and contracts, movable portion 31a is movable vertically upward and downward. A method of holding fixed portion 31b to guide hole 27 is not particularly limited, and for example, fixed portion 31b may be fitted into guide hole 27.

A position of the air spring in a height direction in the second embodiment is adjusted, for example, as below. Initially, positioning member 31 implemented by the plunger is moved vertically downward so that movable portion 31a of positioning member 31 is moved away from positioning hole 9a. Then, stopper assembly 2 is pivoted with respect to lower plate 19 of inner cylindrical member 9 by gripping guide member 7 as the grip portion and pivoting handle 5 with respect to central axis 38. Stopper assembly 2 is pivoted such that positioning hole 9a no longer faces guide hole 27. Then, movable portion 31a of positioning member 31 is brought in contact with an outer surface of lower plate 19 of inner cylindrical member 9 by inserting again positioning member 31 into guide hole 27. FIG. 8 shows this stage. Thereafter, guide member 7 is again gripped as the grip portion and handle 5 is pivoted around central axis 38. Inner cylindrical member 9 is moved while the tip end of movable portion 31a of positioning member 31 comes in contact with the outer surface of lower plate 19 of inner cylindrical member 9. When positioning hole 9a is located vertically above movable portion 31a of positioning member 31 and movable portion 31a of positioning member 31 is no longer in contact with the outer surface of lower plate 19 of inner cylindrical member 9, as shown in FIG. 9, movable portion 31a of positioning member 31 is biased vertically upward and inserted in positioning hole 9a.

Since the construction is otherwise the same as in the first embodiment, description thereof will not be provided.

Third Embodiment

A construction of a bogie according to a third embodiment will be described below.

Figure 10:
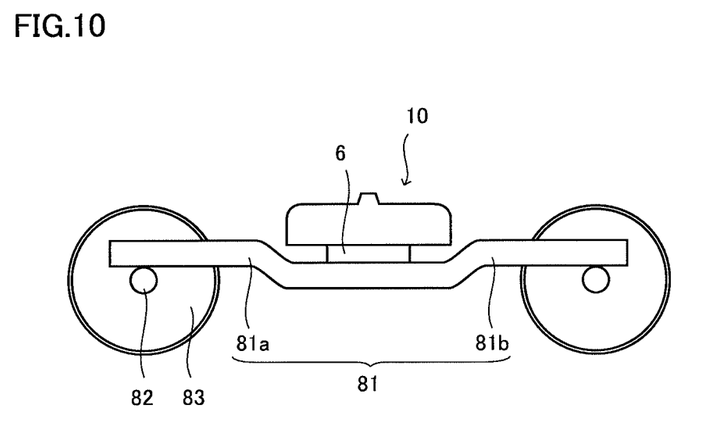
FIG. 10 is a side view of a bogie according to a third embodiment of the present invention.

FIG. 10 is a side view of a bogie according to the third embodiment. As shown in FIG. 10, the bogie according to the third embodiment has air spring 10, a bogie frame 81, an axle 82, and a wheel 83. Bogie frame 81 has a lateral beam 81a and a lateral beam 81b. Wheels 83 are attached to opposing ends of axle 82. Axle 82 is attached to bogie frame 81. More specifically, bogie frame 81 is attached to axles 82 as lateral beam 81a and lateral beam 81b are received and supported by axles 82 with axle springs (not shown) being interposed. Air spring 10 is an air spring according to any of the first and second embodiments. Air spring 10 is attached to bogie frame 81. More specifically, a side of laminated rubber 6 of air spring 10 is attached to bogie frame 81.

An effect of the bogie according to the third embodiment will be described below.

As set forth above, the bogie according to the third embodiment has air spring 10 according to any of the first and second embodiments. Therefore, according to the bogie in the third embodiment, break of air spring 10 can be suppressed even when vibration is applied in a direction perpendicular to the direction from outer cylindrical member 1 toward inner cylindrical member 2.

Though the embodiments of the present invention have been described as above, combination of features in each embodiment as appropriate is also originally intended. It should be understood that the embodiments disclosed herein are illustrative and non-restrictive in every respect. The scope of the present invention is defined by the terms of the claims and is intended to include any modifications within the scope and meaning equivalent to the terms of the claims.

REFERENCE SIGNS LIST 1 outer cylindrical member; 2 stopper assembly; 3 space portion; 4 diaphragm; 5 handle; 5a opening; 6 laminated rubber; 7 guide member; 7a main body portion; 7b shoulder portion; 7c tip end portion; 8 bottom plate; 9 inner cylindrical member; 9a positioning hole; 9b end; 10 air spring; 11, 12, 13, 14 protrusion portion; 16 ring-shaped projection portion; 17 coupling portion; 18 flange portion; 19 lower plate; 21 stopper portion; 22 base portion; 23 ring portion; 24 hole portion; 25 screw; 26 rubber seat; 27 guide hole; 28 bolt; 31 positioning member; 31a movable portion; 31b fixed portion; 32 locking member; 33 screw hole; 37 upper plate; 37a flat plate portion; 37b sidewall portion; 38 central axis; 81 bogie frame; 82 axle; and 83 wheel.

The invention claimed is:

1. An air spring comprising:
an outer cylindrical member;
an inner cylindrical member combined with the outer cylindrical member;
a diaphragm coupling the outer cylindrical member and the inner cylindrical member to each other, the diaphragm providing an internal space between the outer cylindrical member and the inner cylindrical member;
a stopper assembly arranged in the internal space as being pivotable over the inner cylindrical member, the stopper assembly allowing suppression of movement of the outer cylindrical member toward the inner cylindrical member more than necessary;
a handle for pivoting the stopper assembly over the inner cylindrical member;
a guide member attached to the handle as rising from the handle;
a positioning member attached by insertion in a guide hole in the guide member for positioning of the handle, the positioning member being a plunger including a movable portion and a fixed portion, the fixed portion being fixed to the guide member;

a positioning hole provided in the inner cylindrical member which can receive the positioning member; and a holding mechanism for holding the positioning member in the inner cylindrical member with the positioning member being inserted in the positioning hole, a position of the stopper assembly with respect to the inner cylindrical member being determined by inserting the positioning member in the positioning hole.

2. The air spring according to claim 1, wherein the guide hole and the positioning hole extend in an identical direction.

3. The air spring according to claim 1 or 2, wherein the positioning hole passes through the inner cylindrical member.

4. The air spring according to claim 1 or 2, wherein the positioning hole has an end opposite to the guide hole closed by the inner cylindrical member.

5. The air spring according to claim 1 or 2, wherein the positioning hole has an end opposite to the guide hole closed by the diaphragm.

6. The air spring according to claim 1 or 2, wherein the guide member is attached by fitting one end of the guide member into an opening in the handle.

7. The air spring according to claim 1 or 2, wherein the guide hole passes through the guide member.

8. The air spring according to claim 1 or 2, wherein the guide member serves as a grip portion in pivoting the stopper assembly.

9. The air spring according to claim 1 or 2, wherein the movable portion is retracted in the guide hole when an outer surface of the inner cylindrical member is located above and enters the positioning hole when the positioning hole is located above.

10. A bogie comprising the air spring according to claim 1 or 2.

* * * * *